(12) United States Patent
Black et al.

(10) Patent No.: US 9,865,053 B1
(45) Date of Patent: Jan. 9, 2018

(54) METHOD FOR SCORING PATHOLOGY IMAGES USING SPATIAL STATISTICS OF CELLS IN TISSUES

(71) Applicant: Flagship Biosciences, Inc., Westminster, CO (US)

(72) Inventors: Joshua C. Black, Aurora, CO (US); Logan Jerome Cerkovnik, Highlands Ranch, CO (US); Famke Aeffner, Boulder, CO (US); Nathan T. Martin, Broomfield, CO (US); Joseph Krueger, Andover, MA (US); Holger Lange, Enger (DE)

(73) Assignee: Flagship Biosciences, Inc., Westminster, CO (US)

( * ) Notice: Subject to any disclaimer, the term of this patent is extended or adjusted under 35 U.S.C. 154(b) by 19 days.

(21) Appl. No.: 15/181,156

(22) Filed: Jun. 13, 2016

Related U.S. Application Data

(63) Continuation-in-part of application No. 14/189,833, filed on Feb. 25, 2014, now abandoned, which is a continuation-in-part of application No. 13/247,991, filed on Sep. 28, 2011, now Pat. No. 8,787,651.

(60) Provisional application No. 62/303,317, filed on Mar. 3, 2016, provisional application No. 61/769,074, filed on Feb. 25, 2013.

(51) Int. Cl.
*G06K 9/00* (2006.01)
*G06T 7/00* (2017.01)
*G06K 9/46* (2006.01)
*G06K 9/62* (2006.01)

(52) U.S. Cl.
CPC .......... *G06T 7/0012* (2013.01); *G06K 9/4604* (2013.01); *G06K 9/6215* (2013.01); *G06K 9/6298* (2013.01); *G06T 2207/30024* (2013.01)

(58) Field of Classification Search
CPC ............ A61K 2300/00; A61K 38/1858; A61K 38/1841; A61K 38/1833; A61K 48/00; C07K 16/22; G01N 2800/245; G01N 33/6893
USPC ........... 382/133; 514/9.4, 13.3, 8.2, 8.9, 9.1; 530/399
See application file for complete search history.

(56) References Cited

U.S. PATENT DOCUMENTS 5,837,676 A * 11/1998 Goldberg ........... A61K 38/1833 514/13.3

* cited by examiner

*Primary Examiner* — Charlotte M Baker
(74) *Attorney, Agent, or Firm* — Josiah Barbour

(57) ABSTRACT

The disclosure concerns a method for extracting geographic distribution statistics from patient tissue samples assayed with a tissue-based test for the purpose of scoring the patient tissue samples and guiding treatment based on the score(s). The method described herein utilizes digital image analysis of an image of one or more tissue sections to extract object-based (e.g., cells) features to generate a data array representing said tissue numerically in image analysis feature space. The numerical representation of the image of the tissue section in image analysis feature space is further processed using one or more algorithm processes to extract sophisticated geographical distribution features of one or more object type or sub-type in the tissue. Statistics describing the geographic distribution features are summarized to generate a patient-specific diagnostic score, and this score can be evaluated to guide patient treatment decisions.

18 Claims, 16 Drawing Sheets

Example Image of Tissue Stained for a Biomarker:

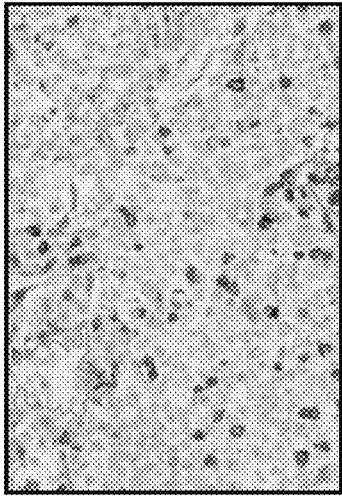

Example Visualization of Extracted Geographic Distribution Statistical Analysis:

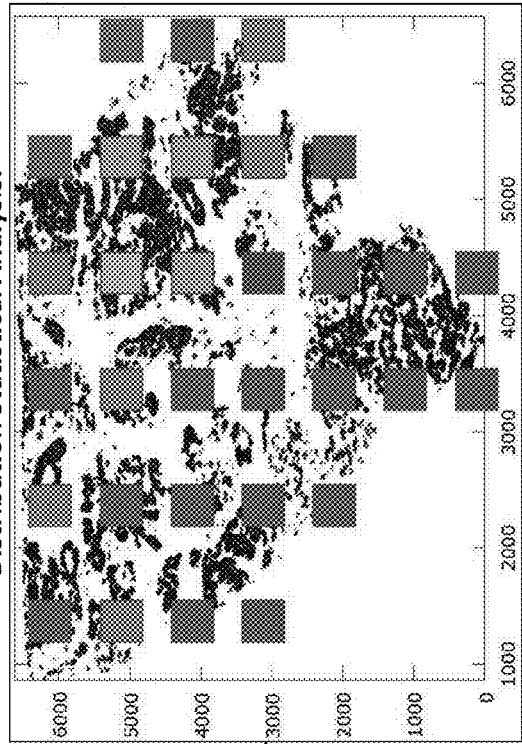

Extraction of features with an algorithm process → Data array representing tissue in image analysis feature space → Extract geographic distribution statistics with area-based analysis framework { Grid density-based Analysis

FIG. 13

METHOD FOR SCORING PATHOLOGY IMAGES USING SPATIAL STATISTICS OF CELLS IN TISSUES

CROSS-REFERENCE TO RELATED APPLICATIONS

This application is a continuation-in-part (CIP) of U.S. Ser. No. 14/189,833, filed Feb. 25, 2014, and titled "CELL-BASED IMAGE REGISTRATION", which is a CIP of U.S. Ser. No. 13/247,991, filed Sep. 28, 2011, titled "METHODS FOR FEATURE ANALYSIS ON CONSECUTIVE TISSUE SECTIONS", and claims priority with U.S. Provisional Application Ser. No. 61/769,074. Filed Feb. 25, 2013, titled "CELL BASED IMAGE REGISTRATION"; and further claims benefit of priority with U.S. Provisional Ser. No. 62/303,317, filed Mar. 3, 2015, and titled "METHODS FOR ASSESSMENT OF SPATIAL STATISTICS OF CELLS IN TISSUE SAMPLES";

the contents of each of which are hereby incorporated by reference.

BACKGROUND

Field of the Invention

This application relates to methods for scoring the geographic distributions or patterns of cells within tissue biopsies. More specifically, the invention relates to the use of spatial statistics to determine geographic distributions of cells in tissues.

Description of the Related Art

The majority of current tissue-based in vitro diagnostic assays (e.g., immunohistochemistry (IHC), chromogenic or fluorescent in situ hybridization (CISH or FISH, respectively), immunofluorescent (IF), mass spectrometry imaging (MSI)), companion diagnostics, laboratory developed tests, and research use only assays are based on measuring: (i) the expression level of a single biomarker within a tissue sample, or (ii) assessing the frequency of biomarker-positive, or graded expression levels of, cells within a tissue sample. Scoring these attributes of the tissue and biomarker(s) using quantitative (e.g., image analysis), semi-quantitative (e.g., manual pathologist H-score), or qualitative (e.g., manual pathology 0, 1, 2, 3+ scoring paradigm) methods are utilized to conduct medical research or inform a physician for determination of diagnosis, prognosis, or to guide future treatment decisions.

However, tissue-based assays only evaluate biomarker positivity or expression levels in tissue with limited granularity in regard to the geographic distribution or pattern of cells. Previous efforts to evaluate the relationships between multiple cell types within tissues are limited to relatively simplistic assignments of cell location (e.g., biomarker positive cells in the tumor tissue compartment) or distance (e.g., biomarker positive cells within a distance from the tumor/stroma interface), and do not rely on the tissue-wide geographic distribution statistics embodied in this invention.

SUMMARY

Currently, sophisticated quantification of the geographic distribution or pattern of cells within a tissue (e.g., modeling cell-to-cell interactions relative to random distributions, extraction of higher order statistics from density surface renderings, spatial assessment of autocorrelation between marker-positive cells) are not quantified nor utilized in a manner to guide a physician's determination of diagnosis, prediction of prognosis, or assessment of future treatments with a drug. While specific components of these approaches may be implemented in medical research, a defined process resulting in a summary score with medical utility has not been described.

Herein, we present a method that utilizes digital image analysis to extract sophisticated statistics pertaining to the geographic distribution and patterns of cells within a tissue assayed by a tissue-based test relative to or independent of biomarkers staining, cell types, and overall tissue architecture to be used in medical research and practice.

In accordance with the embodiments herein, a method for extracting geographic distribution statistics from patient tissue samples assayed with a tissue-based test for the purpose of scoring said patient sample and guiding medical research or treatment based on said score. The method described herein utilizes digital image analysis of an image of one or more tissue sections to extract object-based (e.g., cells) features to generate a dataset that associates a quantity of a specific analyte or biomolecule at a specific location in a tissue object in the tissue section. The numerical representation of the image of the tissue section in image analysis feature space is further processed using one or more algorithm processes to extract sophisticated geographical distribution features of one or more object type or sub-type in the tissue. Statistics describing the geographic distribution features are summarized to generate a patient-specific diagnostic score, and this score is evaluated to guide patient treatment decisions.

BRIEF DESCRIPTION OF THE DRAWINGS

FIG. 13 shows an overview of an area-based analysis of cells within a tissue.

DETAILED DESCRIPTION OF THE PREFERRED EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention.

For purpose of definition, a tissue object is one or more of a cell (e.g., immune cell), cell sub-compartment (e.g., nucleus, cytoplasm, membrane, organelle), cell neighborhood, a tissue compartment (e.g., tumor, tumor microenvironment (TME), stroma, lymphoid follicle, healthy tissue), blood vessel, and/or a lymphatic vessel. Tissue objects are visualized by histologic stains which highlight the presence and localization of a tissue object. Tissue objects can be identified directly by stains specifically applied to highlight said tissue object (e.g., hematoxylin to visualize nuclei, IHC stain for a protein specifically found in a muscle fiber membrane), indirectly by stains applied which non-specifically highlight the tissue compartment (e.g., DAB background staining), or are biomarkers known to be localized to a specific tissue compartment (e.g., nuclear-expressed protein, carbohydrates only found in the cell membrane).

Figure 1:
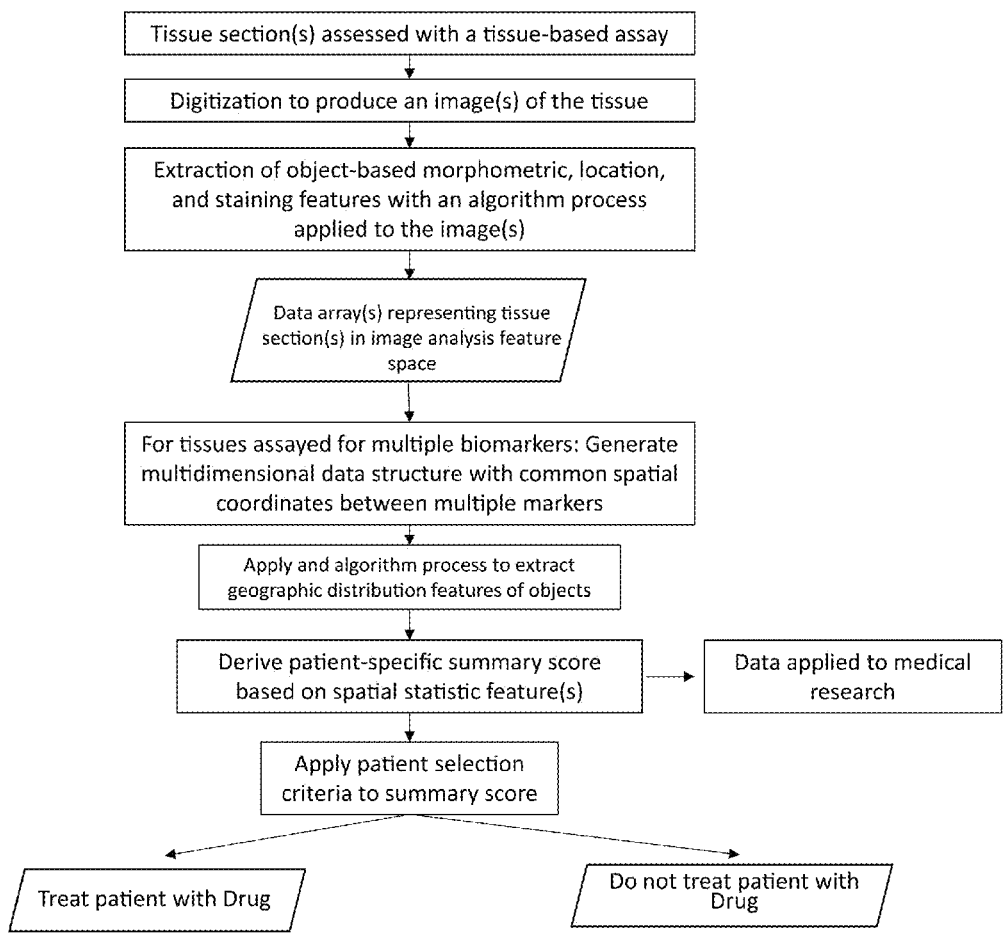
FIG. 1 provides an overview of the method of this invention.

In one embodiment, the method includes: (i) obtaining digital images of stained tissue sections; (ii) extracting staining, morphologic, and location features of tissue objects within each image of the digital images using a digital image analysis algorithm implemented by a computer; (iii) creating a data array representing the tissue(s) in image analysis feature space, (iv) identifying appropriate statistical framework(s) to analyze the geographic distribution features, (v) summarizing the geographic distribution feature(s) using one or more statistical method(s) to extract appropriate summary statistic(s), (vi) deriving a patient-specific diagnostic score which is a summarization of one or more geographical distribution feature summary statistics, (vii) applying patient selection criteria to the patient-specific summary score, and (viii) identifying patients as eligible/ineligible for a particular therapy based on said selection criteria. FIG. 1 outlines this embodiment of the invention.

Extraction of Cellular or Tissue Features by Applying an Algorithm Process

The following described method is utilized to evaluate one or more patient tissue samples assayed with a tissue-based test to determine whether or not said patient or patients are candidates for a specified therapy. For the purposes of this invention, tissue-based assays refer to an assay modality which enables evaluation of tissue samples while retaining tissue architecture. A tissue-based assay enables evaluation of tissue objects and marker stains (e.g., presence and intensity) for biologic molecules (e.g., chromatin, biomarkers) relative to position (e.g., x-y coordinates, polar coordinates) in the tissue.

For example, and not limitation, tissue-based assays of relevance to this invention are IHC, IF, CISH, FISH, and MSI methods. These methods retain overall tissue architecture and enable the evaluation of biomolecules and underlying tissue objects of the sample relative to position in the tissue.

Patient tissue samples for evaluation are generated using standard processes and practices pertaining to IHC, IF, CISH, FISH, and MSI to produce tissue sections which can be evaluated for one or more biomarker or tissue feature. One or more biomarker or tissue feature of interest may be highlighted by one of the above mentioned assay modalities in each tissue section (i.e., mono- and multiplexed assay formats) or on multiple sections from a patient's tissue sample (e.g., one biomarker per serial section for a single patient).

Digitization, using standard practices (i.e., digital slide scanning, imaging with a digital camera mounted on a microscope, MSI), is performed to generate a real (e.g., brightfield image from an IHC-stained tissue) or false image (e.g., color stack from IF-stained tissue, molecule expression stack from MSI evaluated tissue) of the tissue which will be utilized for visualization of the tissue for the biomolecules and features of interest as well as downstream analysis. The digital images of each tissue sample are stored in computer memory or in a database for future recall and analysis.

In another embodiment of this invention, a digital tissue image analysis algorithm implemented by a computer is applied to each image of a tissue sample assayed with a tissue-based test to extract the image analysis features (e.g., morphometric, staining, and location features) pertaining to tissue objects in each image. Image analysis features are extracted for image objects which are groupings of pixels which relate to tissue objects and groupings of cells with similar attributes (e.g., cells of common biomarker staining levels), and interfaces between groupings of cells with similar attributes (e.g., tumor/stroma interface).

Morphometric features pertain to the size, shape, area, texture, organization, organizational relationship, and staining appearance of stains within tissue objects observed in a digital image. For example, and not limitation, morphometric features can be the area of a cell nucleus, the completeness of biomarker staining in a cell membrane, the diameter of a cell nucleus, the roundness of a cell, or lacunarity of biomarker staining in a nucleus.

Staining features pertain to the pixel intensities of specified IHC, ISH, and IF stains or dyes or amount of a molecule determined by MSI-based methodologies. Staining features are evaluated relative to tissue objects (e.g., average staining intensity across pixels in each cell in an image, staining level in a cell membrane, biomolecule expression in a nucleus).

Localization features pertain to the location of objects within a tissue section. Location can be determined based on an absolute (e.g., x and y location based on pixel dimensions of image, μm from center of image defined by pixel dimensions of image) or relative (e.g., x and y position of cells relative to a tissue feature of interest such as a vessel, polar coordinates referenced to the center of mass of a tumor nest) coordinate system (e.g., x-y-z coordinates, polar coordinates). Location for specific image objects can be defined as the centroid of the object or any position extending from the centroid to the exterior limits of the object.

The image analysis algorithm implemented by a computer extracts the image analysis features for each tissue object of interest within an image and stores said values for further analysis in computer memory or to a database.

In a further embodiment, images of one or more tissues assayed by a tissue-based test (e.g., IHC staining for PD-L1, CD8, and Granzyme B) for a single patient are analyzed by an algorithm process implemented by a computer. In this embodiment, the tissues are assayed with monoplex assays (e.g., three slides each stained for one of PD-L1, CD8, and Granzyme B), with one or more multiplex assays (e.g., one slide stained in triplex for PD-L1, CD8, and Granzyme B), or one or more combinations of monoplex and multiplex assays (e.g., one slide stained for PD-L1 and one slide stained with a CD8 and Granzyme B multiplex assay). One or more algorithm processes are applied by a computer to extract image analysis features for tissue objects within the image which results in one or more data arrays representing the tissue(s) in image analysis feature space.

Figure 2:
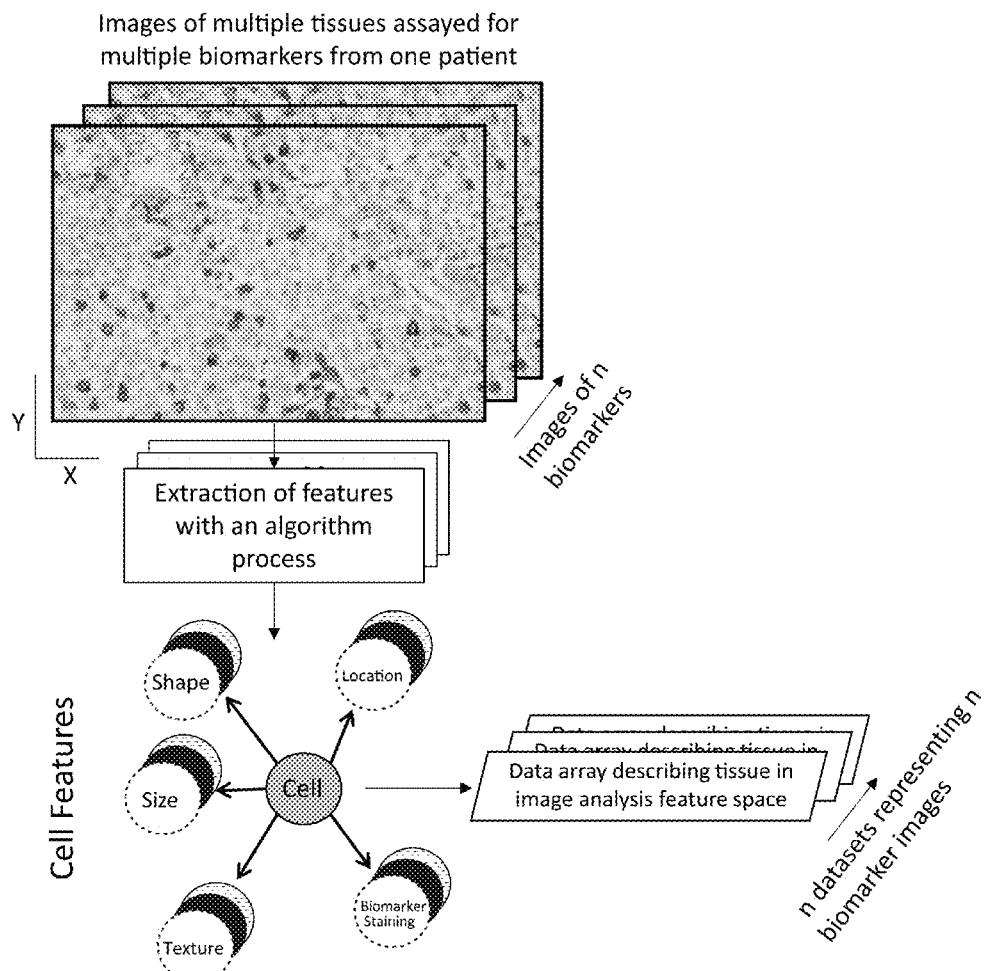
FIG. 2 illustrates the embodiment of this invention whereby singular or multiple tissues are evaluated with tissue-based assays and algorithm processes are applied to generate data array representations of the tissues in image analysis feature space.

FIG. 2 illustrates one embodiment wherein multiple tissue sections from a single patent have been assayed with monoplex assays to evaluate a plurality of biomarkers. One or more algorithm processes are applied to the images of these sections to extract the features of tissue objects in the images, cells in this example, to generate multiple datasets which are numerical data array representations of the sections assayed for the plurality of biomarkers in image analysis feature space.

Figure 3:
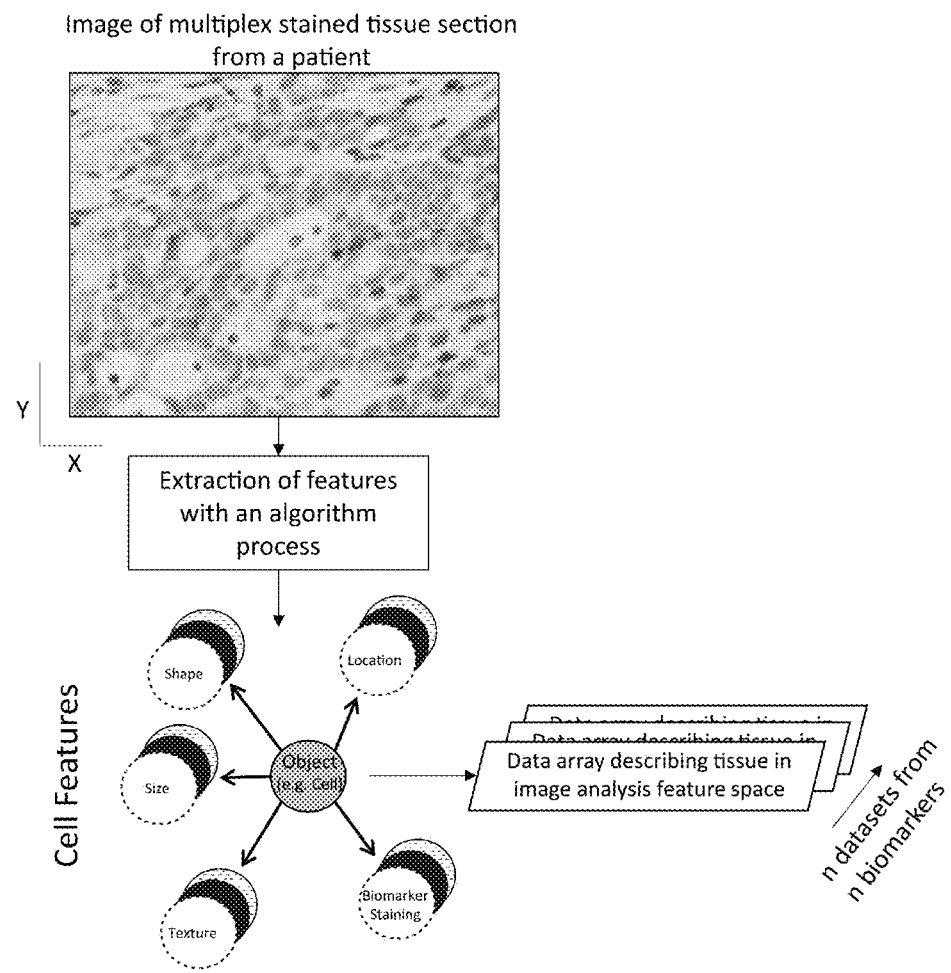
FIG. 3 illustrates the embodiment of this invention whereby a tissue from a patient is evaluated with a multiplex tissue-based assay and an algorithm process is applied to generate a data array representation of the tissue in image analysis feature space.

FIG. 3 illustrates another embodiment wherein a tissue sample is assayed with a multiplex assay to evaluate multiple biomarkers within the same tissue section. One or more algorithm processes are applied to extract the image analysis features of tissue objects within the multiplex stained tissue section, and the tissue object image analysis features are stored in computer memory as numerical data array representations of the tissue section and biomarkers evaluated in image analysis feature space.

Tissue objects can be identified by assay techniques developed to specifically highlight an object (e.g., hematoxylin staining to identify a cell nucleus, false image of nuclear protein expression generated by MSI). These assay techniques can identify each object directly by enabling visualization of the object itself (e.g., hematoxylin staining for nuclei) or the assay techniques can identify an alternative object or tissue feature which allows indirect definition of the tissue object of interest (e.g., cell membrane staining to define cell object, hematoxylin staining and a digital offset distance to define cell cytoplasm). Within the scope of the claimed invention, one or more objects can be identified from a single analysis and multiple image analysis features associated with the one or more tissue objects can be extracted by the algorithm process. Furthermore, tissue objects can be associated with other tissue objects (e.g., cell membrane and cytoplasm associated with the cell's nucleus) or combined (e.g., cell membrane and nucleus combined to define a cell-object) to generate a composite object. The image analysis features of each object or composite object can be extracted by the algorithm process implemented by the computer.

Figure 4A:
FIGS. 4(A-C) provide examples of cell sub-compartment objects.
Figure 4B:
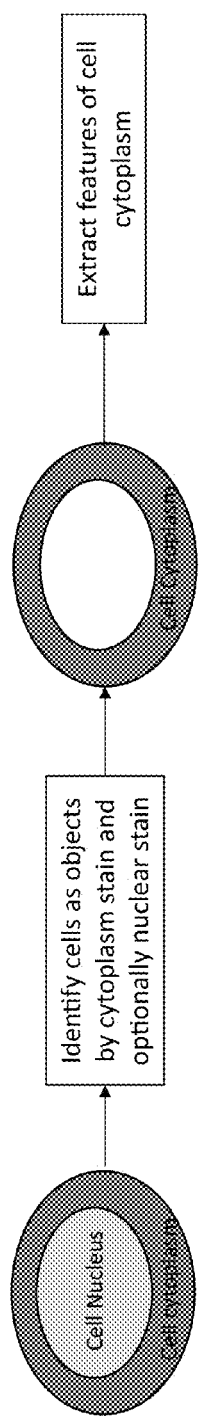
Figure 4C:
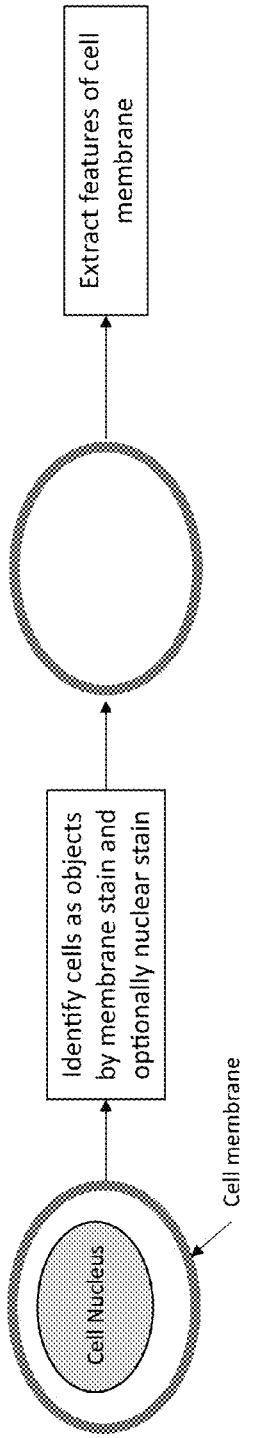
Figure 5A:
FIGS. 5(A-D) illustrate the process by which image analysis features are transformed into a data structure whereby geographic distribution features and related statistics can be extracted during future analysis.
Figure 5B:
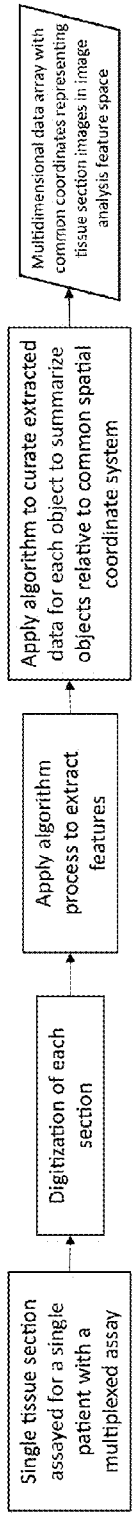
Figure 5C:
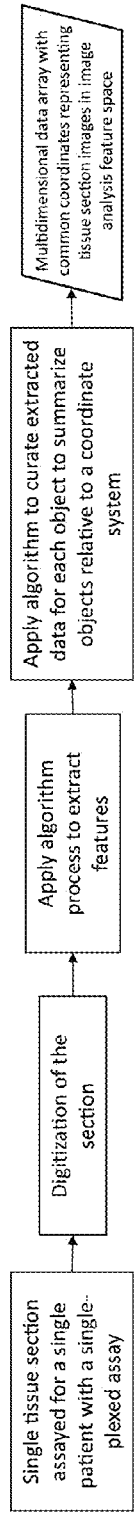
Figure 5D:
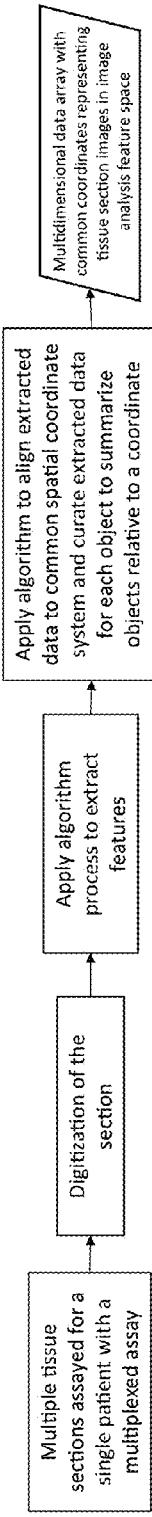

FIGS. 4(A-C) illustrate embodiments wherein tissue objects can be identified by the tissue objects themselves or optionally by nuclear staining and a digital definition of a cell sub-compartment. The algorithm process can be utilized to extract image analysis features from each cell sub-compartment object.

Each tissue object has an associated plurality of features, and each tissue section has a plurality of tissue objects, wherein the geographic distribution of tissue objects within the tissue can have geographic distribution feature summary statistics extracted and analyzed in whole, or in part, in any of the embodiments following.

Creating Data Structures for Spatial Analysis:

In another embodiment, image analysis features are extracted from one or more tissues assayed for one or more biomarkers of interest. For the purpose of this embodiment, the localization features are evaluated and transformed into a format whereby geographic distribution feature statistics can be extracted from the geographic distribution features of tissue objects within the one or more images and associated biomarkers. This transformation can be one or more of: adjustment of location to a different coordinate system from the original analysis (e.g., Cartesian coordinates to polar coordinates), alignment of tissue object location(s) to a common coordinate system (e.g., multiple tissue sections from a single patient translated to a common center of mass), identification of a tissue object subset of interest (e.g., biomarker A positive cells, biomarker A positive and biomarker B negative cells), determination whether or not tissue objects located in different aligned tissue sections are the same tissue object (e.g., cell sectioned into two serial tissue sections), classification of tissue object subsets (e.g., tumor cell class, stroma cell class, inflammatory cell subsets defined by one or more stains), and adjustment to or addition of a third dimension coordinate for each object described in a two-dimensional space (e.g., alignment of serial tissue sections with consideration to section thickness to produce a 3-D description of tissue object position).

FIGS. 5(A-D) provide illustrative examples of a process whereby extracted localization features are evaluated and transformed into a format for extraction of spatial statistics for a variety of tissue-based assay formats. FIG. 5A describes the process by which multiple datasets of image analysis features from multiple assayed tissue sections are aligned to common spatial coordinates which results in a data array representing the tissue sections in image analysis feature space which can be further processed to extract the geographic distribution statistics of tissue objects, and tissue object subsets, identified within the original multiple images. FIG. 5B describes the process by which the image analysis feature dataset for a patient sample evaluated with a multiplex tissue-based assay is curated to summarize tissue objects, and tissue object subsets, relative to a spatial coordinate system which enables extraction of one or more geographic distribution feature statistics. FIG. 5C describes the process by which a dataset of image analysis features extracted from a patient sample evaluated with a monoplex tissue-based assay are curated to relate tissue objects, and tissue object subsets, relative to a spatial coordinate system which enables extraction of one or more geographic distribution feature statistics. FIG. 5D describes the process by which multiple data sets from multiple images, each with a multiplex tissue-based assay, are aligned to common spatial coordinates which results in a data array representing the tissue sections in image analysis feature space which can be further processed to extract the geographic distribution statistics of tissue objects, and tissue object subsets, identified within the original multiple images.

Extraction of Geographic Distribution Feature Statistic(s) Describing the Geographic Distribution of Image Objects and Image Object Subsets According to one embodiment of this invention, geographic distribution statistics are extracted from the data array representation of the assayed tissue section(s) for a patient in image analysis feature space once a data structure is generated which contains one or more image analysis features. An algorithm process is applied to the data structure in whole or in part to extract one or more geographic distribution features and associated summary statistics describing the geographic distribution of tissue objects or tissue object subsets (e.g., tumor cells, biomarker-positive cells, tumor nests). A variety of geographic distribution features and summary statistic types can be extracted and are calculated using point-pattern, point-referenced, or areal analysis frameworks.

In an embodiment of this invention, the geographic distribution of tissue objects is analyzed as a spatial point-pattern. Spatial point-patterns can be used to identify spatial trends in point density and position. For example, and not limitation, a data set in this embodiment could include a set of positions of cells in an IHC-stained tissue slide.

In the point-pattern analysis framework, image objects can be unmarked (e.g., all cell-objects identified without sub-classification), where only density of tissue objects is evaluated independent of tissue object classification. Alternatively, tissue objects can be marked (e.g., classified into sub-classes) based on one or more image analysis features, where the value of the covariate feature is assessed as a spatial density. Marks can be discrete values (e.g., biomarker positive/negative, biomarker 0, 1, 2, 3+ staining category) or continuous (e.g., biomarker staining intensity, cell size).

Once a point-pattern analysis approach is defined, quantification of the pattern would use summative methods such as, but not limited to: nearest neighbor distances, pair correlation functions, Ripley's K-function and related functions, or variogram indexing.

Figure 6:
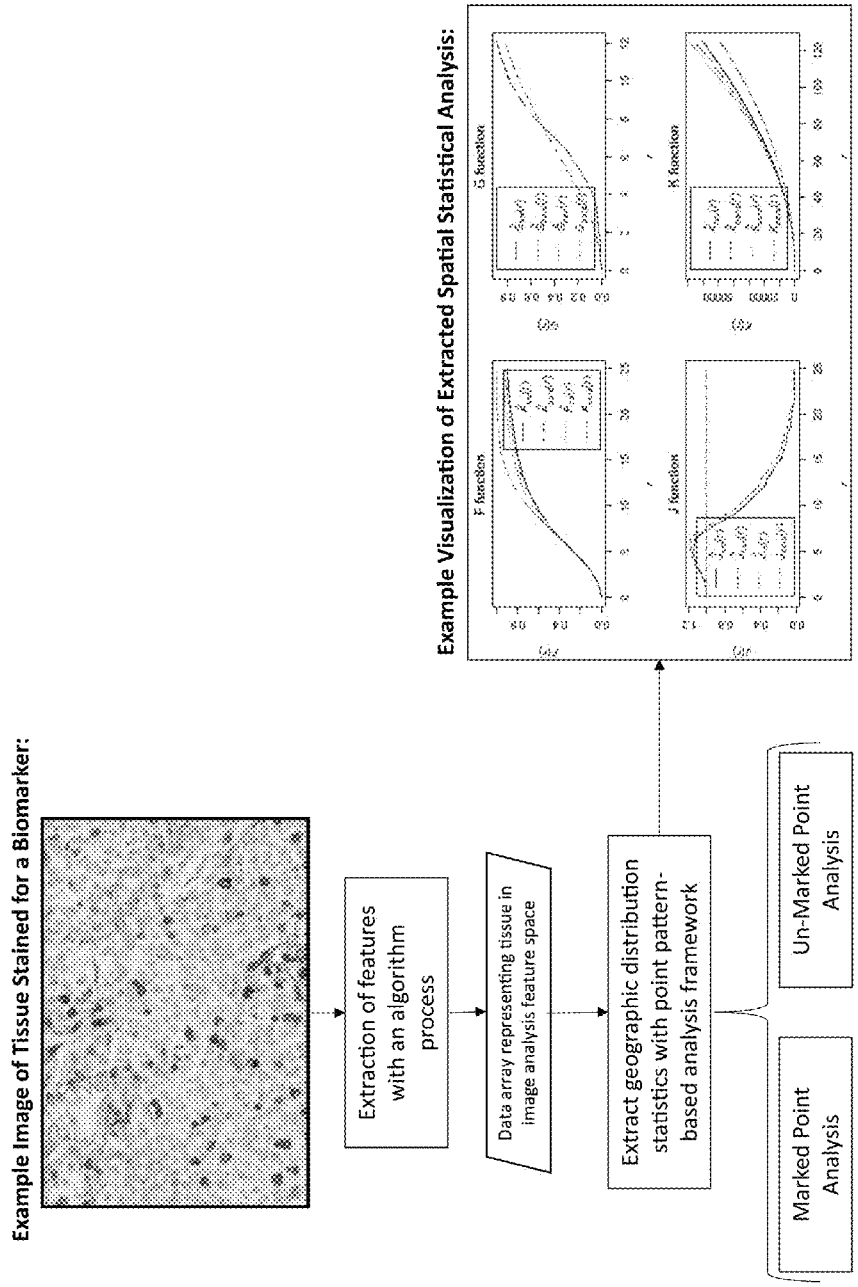
FIG. 6 provides and overview of the embodiment of this invention whereby geographic distribution feature statistics are derived using a point-pattern analysis framework.

In an illustrative example of this embodiment, FIG. 6, demonstrates the use of spatial point-patterns to summarize the geographic distribution of tissue objects within an image. In this example, an image of an IHC-stained tissue is processed to extract the image analysis features to represent the tissue in image analysis feature space. A point-patterned analysis framework is applied to the geographic distribution of the tissue objects to derive a plurality of distribution features and summary statistics. In this example, a series of cell locations, defined by the X and Y positions of the centroids of cells, are used to build a pairwise distance matrix between points. The distance matrix can be used to calculate Ripley's K-function, and related statistics used to summarize the geographic distribution based on evaluation of the K-function. For example, and not limitation, this function can be used to identify areas of clustering or areas of dispersion of the biomarker in the tissue, where the value of the K-statistic is the cumulative average number of cells lying within a distance r from a typical cell. An example of a summary statistic from this analysis would be the distance of maximum deviation of cumulative average number of cells from a random process (such as a Poisson or Gibbs process).

Figure 7:
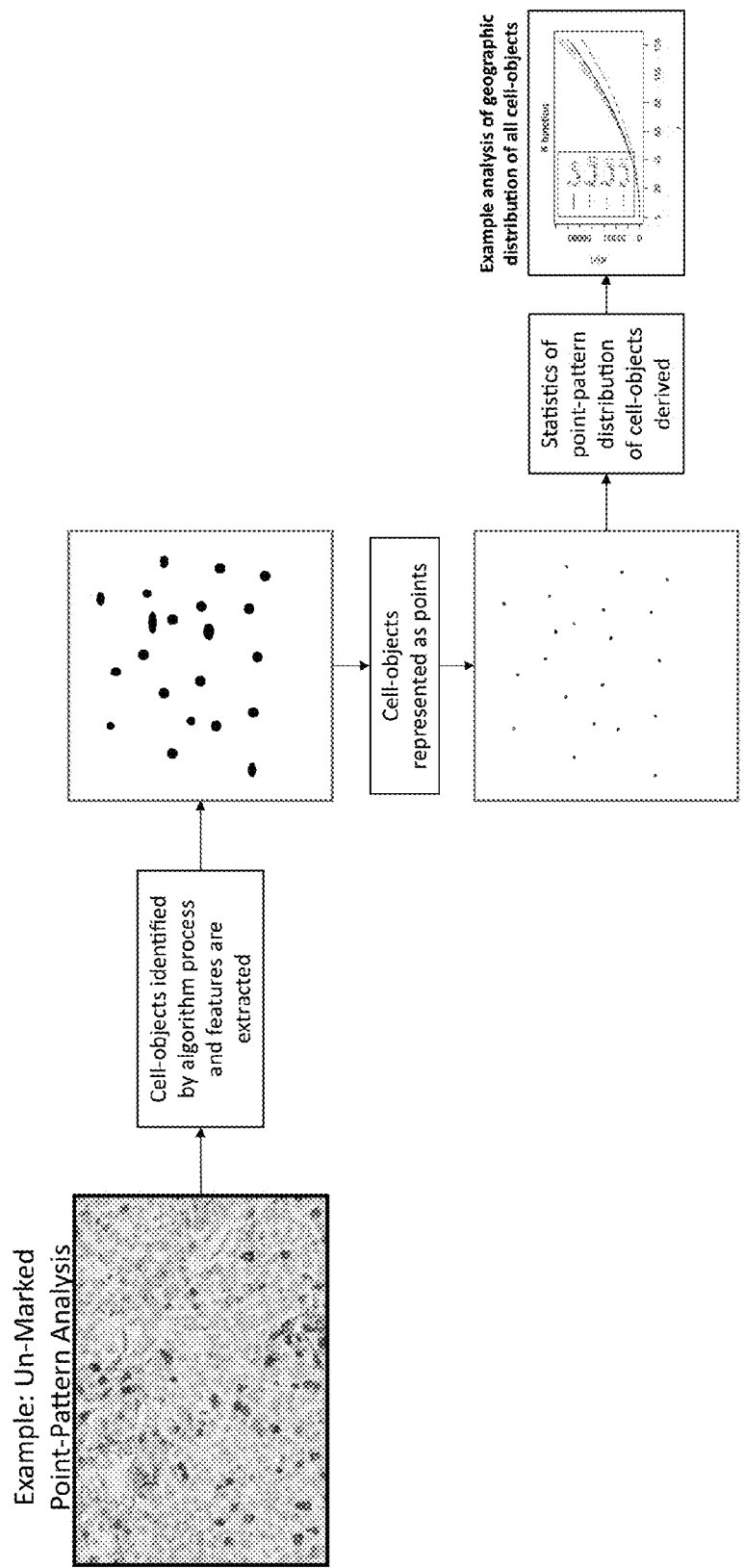
FIG. 7 provides an example of an un-marked point-pattern analysis of cell objects in an image.

FIG. 7 provides an example of an un-marked point-pattern analysis of a tissue section whereby each tissue object is represented as a point. The pattern of the points distributed in the image are evaluated using an un-marked point-pattern analysis approach to derive Ripley's K-function to describe the distribution of cells throughout the image irrespective of cell class (e.g., tumor cells, biomarker positive cells).

Figure 8:
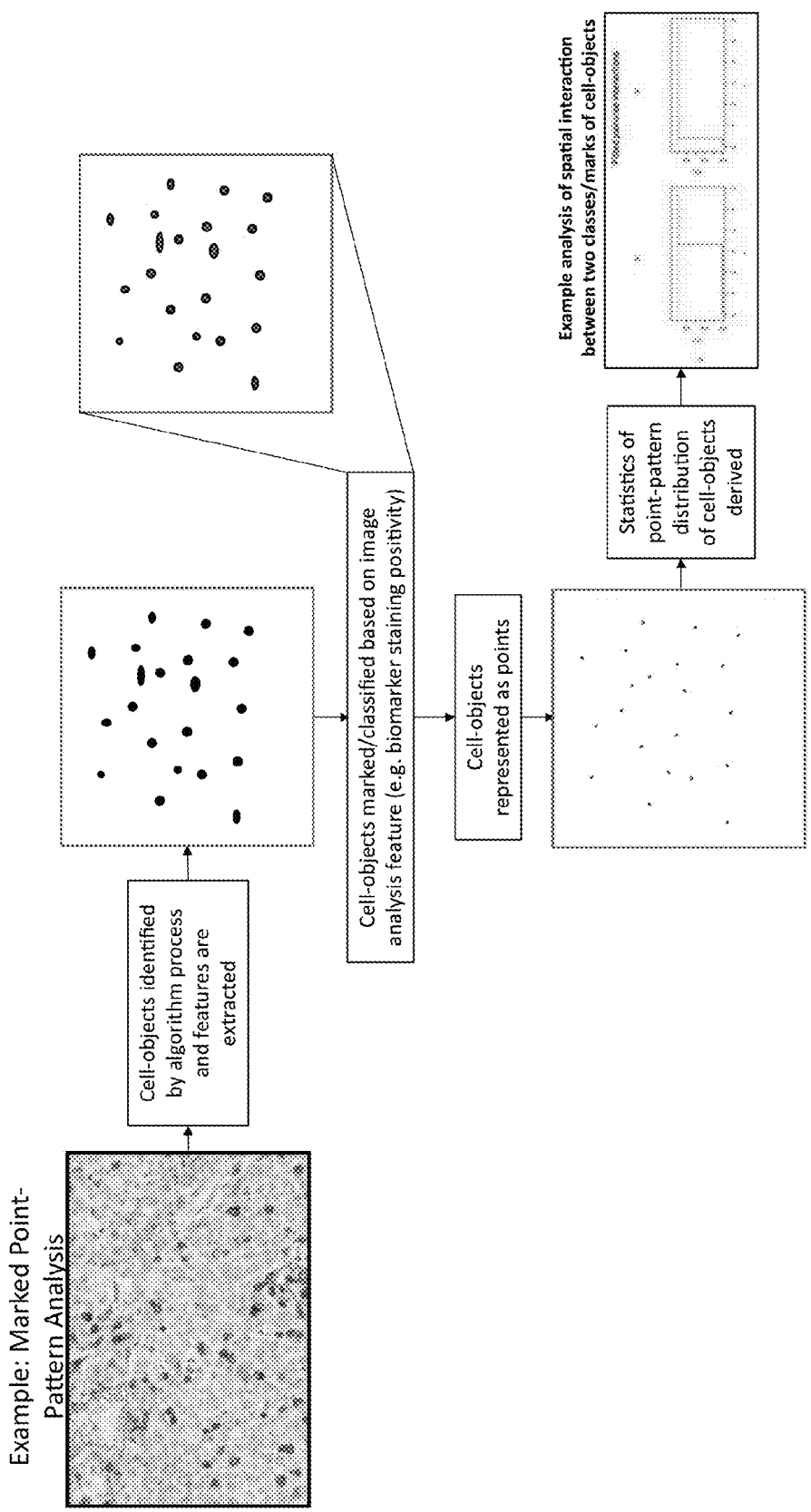
FIG. 8 provides an example of a marked point-pattern analysis of cell objects in an image where both sets of marks are analyzed together to determine the interactions between the two marks.

FIG. 8 provides an example of a marked point-pattern analysis of a tissue section whereby each tissue object is represented as a point and given a mark (e.g., cell class as biomarker-positive or biomarker-negative) based on one or more image analysis features. In this example, a marked point-pattern analysis approach is applied to all or specified cells within the image, taking into account the marking of each cell, to evaluate the pairwise interaction of the two cell marks using a Gibbs process model. This analysis can be utilized to evaluate the range and behavior of spatial interactions between cells of two or more different marks (e.g., cells classified/marked as PD-L1 positive and cells classified/marked as CD8 positive).

Figure 9:
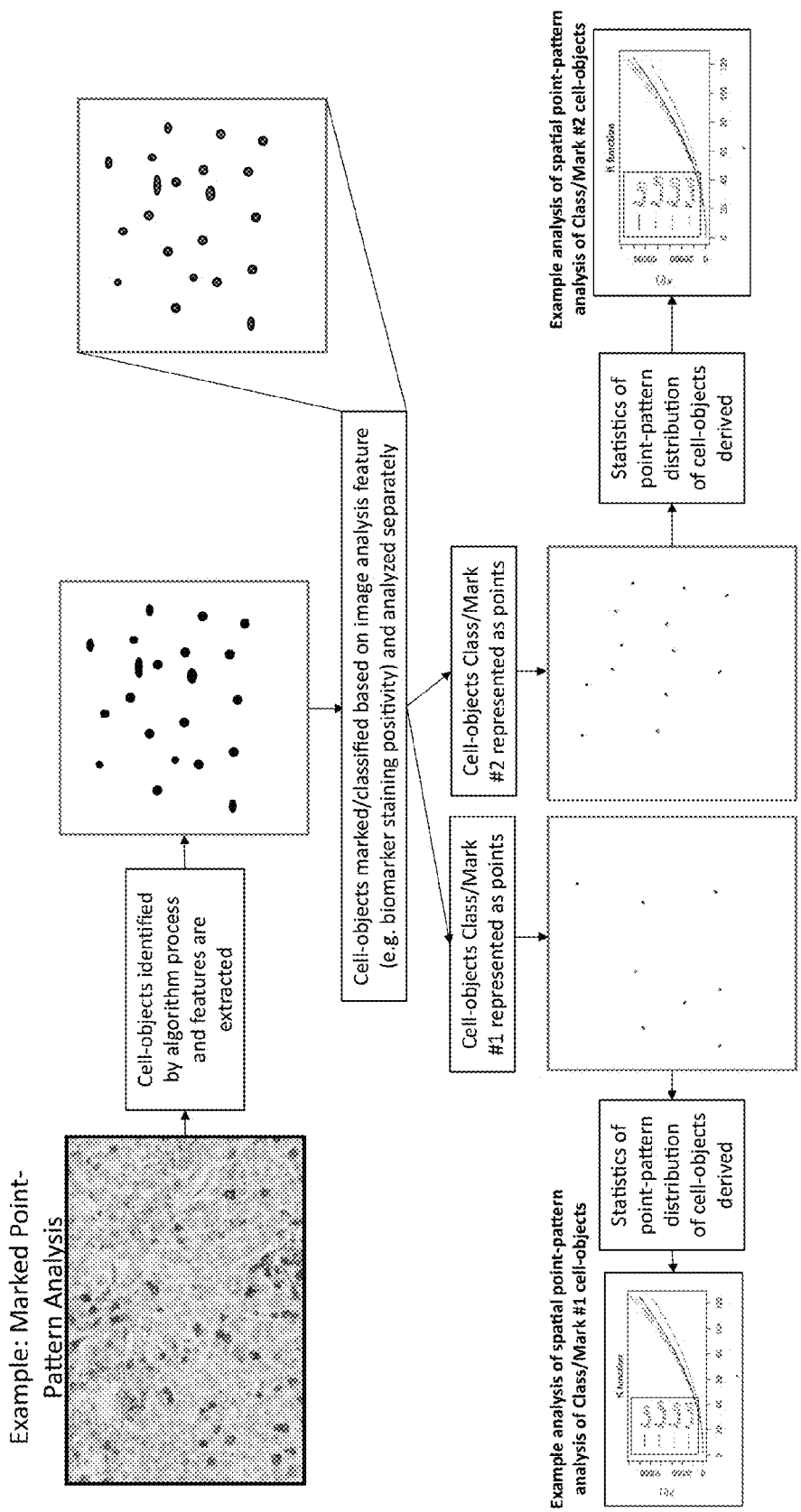
FIG. 9 provides an example of a marked point-pattern analysis of cell objects in an image where each mark is analyzed separately to determine the geographic distribution of each mark independently of each other.

FIG. 9 provides and alternative example of marked point-pattern analysis of a tissue section whereby each tissue object is represented as a point and given a mark (e.g., cell class by biomarker-positive, biomarker-negative, tumor cell) based on one or more image analysis features. The tissue objects are analyzed separately based on mark and geographic distribution feature statistics pertaining to each tissue object mark are derived. In this example, Ripley's K-function is calculated independently for each tissue object class/mark.

In another embodiment of this invention, the geographic distribution of tissue objects is analyzed as continuous spatial distributions, using a point-referenced analysis framework. Point-referenced data models the continuous change in density of tissue objects or subclasses of objects across the tissue sample(s). For example, a set in this embodiment would be a function where the density of cells described by one or more image analysis feature values varies across the sample, which could be built from set of positions of cells in an IHC slide and covariate feature, if needed.

Once the function is determined, quantification of the function would use summative methods such as, but not limited to: curvature features, vector calculus features (i.e., gradient features, curl features, divergent features, and Laplacian features), global and local significance tests, point-pattern analysis of global and local minimum and maximum, and areas under the curve (AUC).

Additionally, for situations whereby it is of interest to derive a geographic distribution summary statistic for features describing the interaction or localization between two or more tissue object subsets (e.g., cells evaluated for two biomarkers, tumor cells and stroma cells, cell membranes evaluated for a plurality of biomarkers), statistics describing the interactions between two or more point-referenced analysis functions can be extracted. Summary statistics can relate to, but are not limited to, one or more of: methods described above for function resulting from the subtraction, multiplication, division or addition of two or more point-referenced analysis functions, methods described above for the function resulting from the thresholding of one or more point-referenced analysis functions by another, point-pattern analysis of point-referenced analysis function summary values described above with the one or more functions defining mark.

Modeling the continuous change in density between objects, or object sub-sets, in a point-referenced analysis framework can be achieved through several approaches. For example, and not limitation, Kriging-, spline-, and/or KDE- (kernel density estimate) based methods can be utilized to model the continuous change in density from tissue object point to tissue object point. The resulting surface representation of tissue object, or tissue object sub-set, density and localization can be further evaluated to derive summary spatial statistics.

Figure 10:
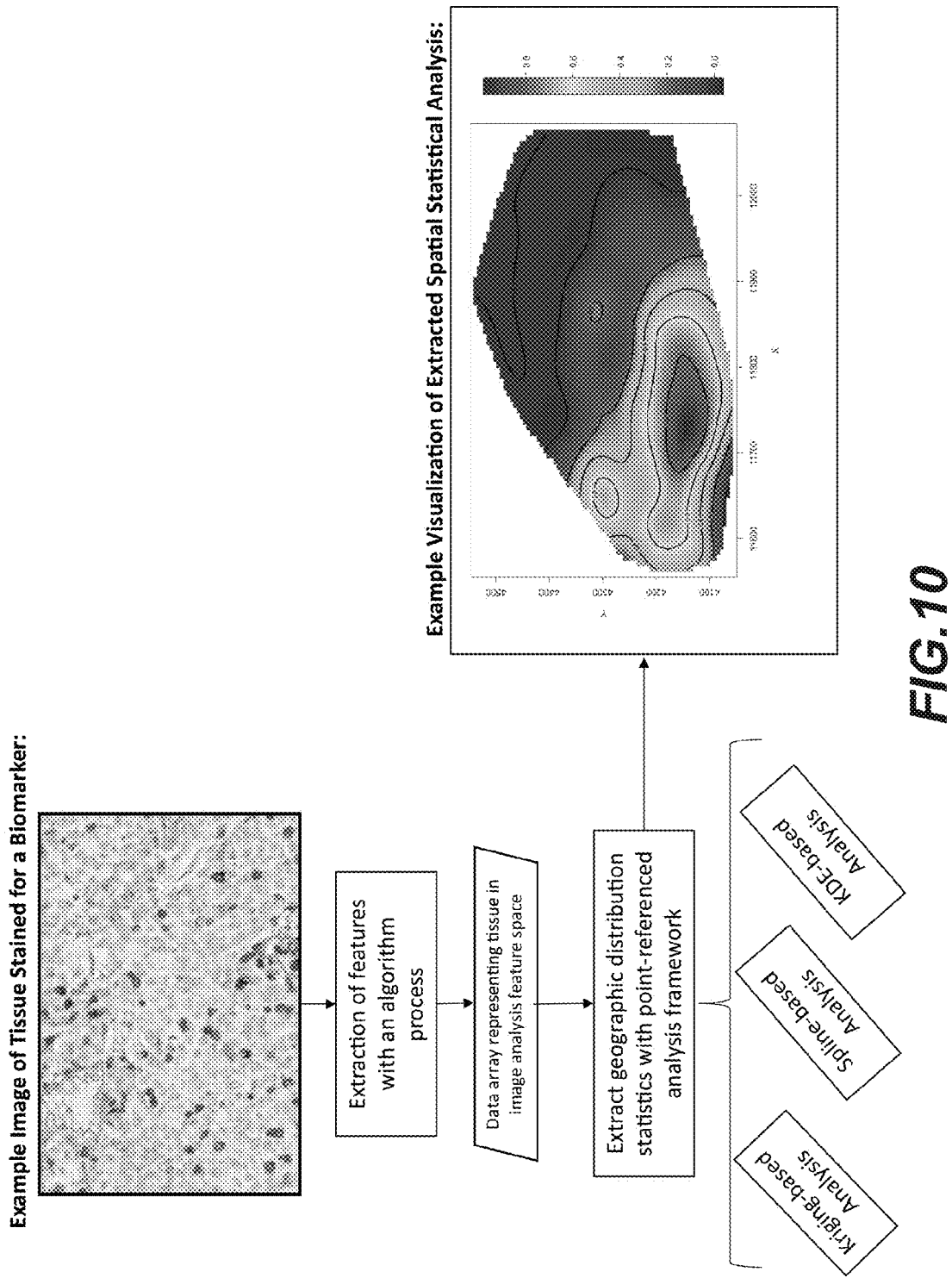
FIG. 10 provides an example of a point-referenced analysis of cells in an image to derive a continuous surface representation of cell density.

FIG. 10 provides an example of this aspect of the invention whereby a point-referenced analysis framework is utilized to calculate the continuous density function from a numerical representation of a stained tissue section. The continuous density function is visualized as a surface or heat map of cell density by location within the image. Features describing the continuous density function (e.g., points of maxima, AUC between fixed points, vector representation of high density ridges) can be extracted and processed to derive summary statistics.

Point-pattern and point-referenced spatial analysis frameworks result in a function describing the geographical distribution of tissue objects or tissue object subsets which defines a curve or surface. Geographic distribution features of these curves or surfaces are extracted to derive summary statistics which can be used to derive a patient-specific diagnostic score. Summary statistics describing curve or surface features can be derived from the original curve or surface itself or from the composite curve or surface which results from combination (e.g., addition, subtraction, division, multiplication, powers, exponents, logical operators, thresholding) of two or more curves or surfaces. Spatial statistics can be derived for features of the overall shape of the curves or surfaces and can also be derived from the fine and hyper-fine structure of the curves or surfaces. Furthermore, the functions describing the curve or surface of the geographic distribution analysis can be integrated or differentiated to identify and evaluate features (e.g., change in density across a tissue indicated by the derivative of the density curve) associated with the integrated or differentiated curves or surfaces.

Figure 11:
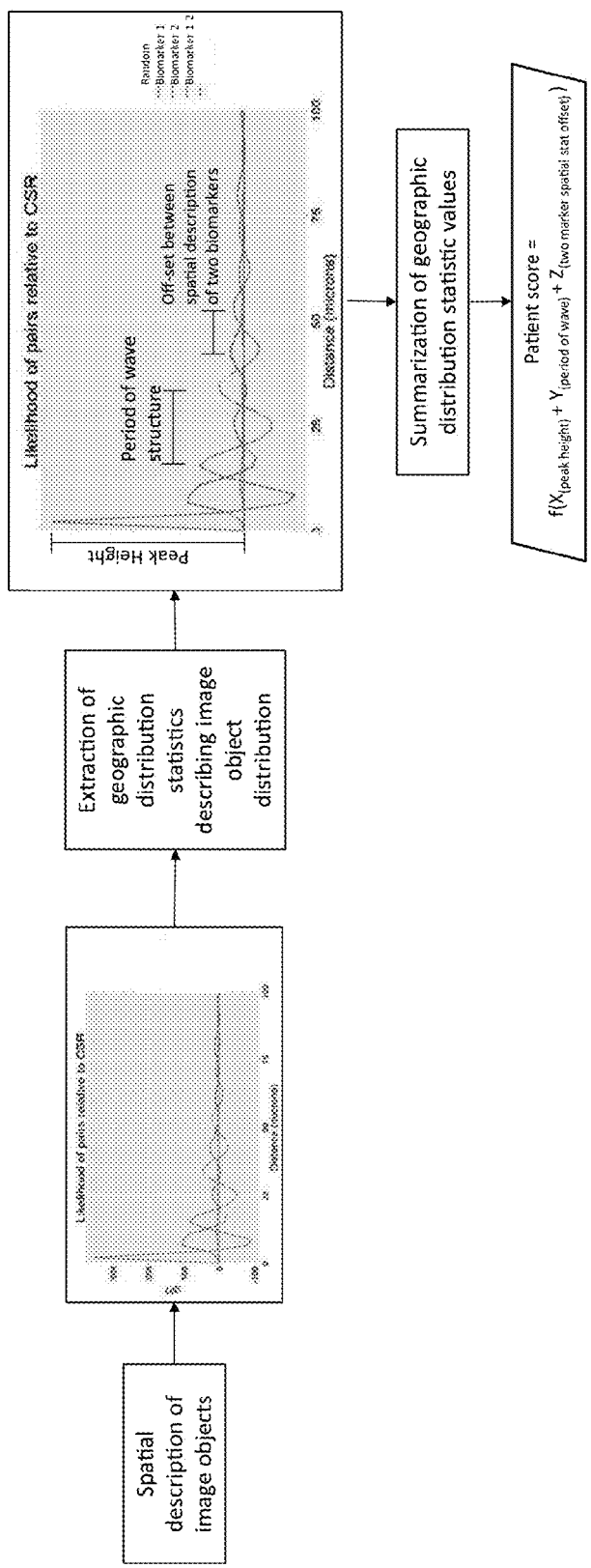
FIG. 11 show an example of extracting geographic distribution statistics from a curve generated by point-pattern analysis of cells in an image.

FIG. 11 provides an illustrative example of extraction of geographic distribution feature statistics which describe a curve resulting from a point-pattern analysis of a tissue image. In this example, summary statistics which capture the overall shape or nature of the curve are extracted, such as peak height of the global maximum, periodicity of curve structure, and the offset between two curves derived from analysis of two different object sub-classes. These spatial statistics can be summarized to generate a patient-specific diagnostic score which is a function of the geographic distribution statistics.

Figure 12:
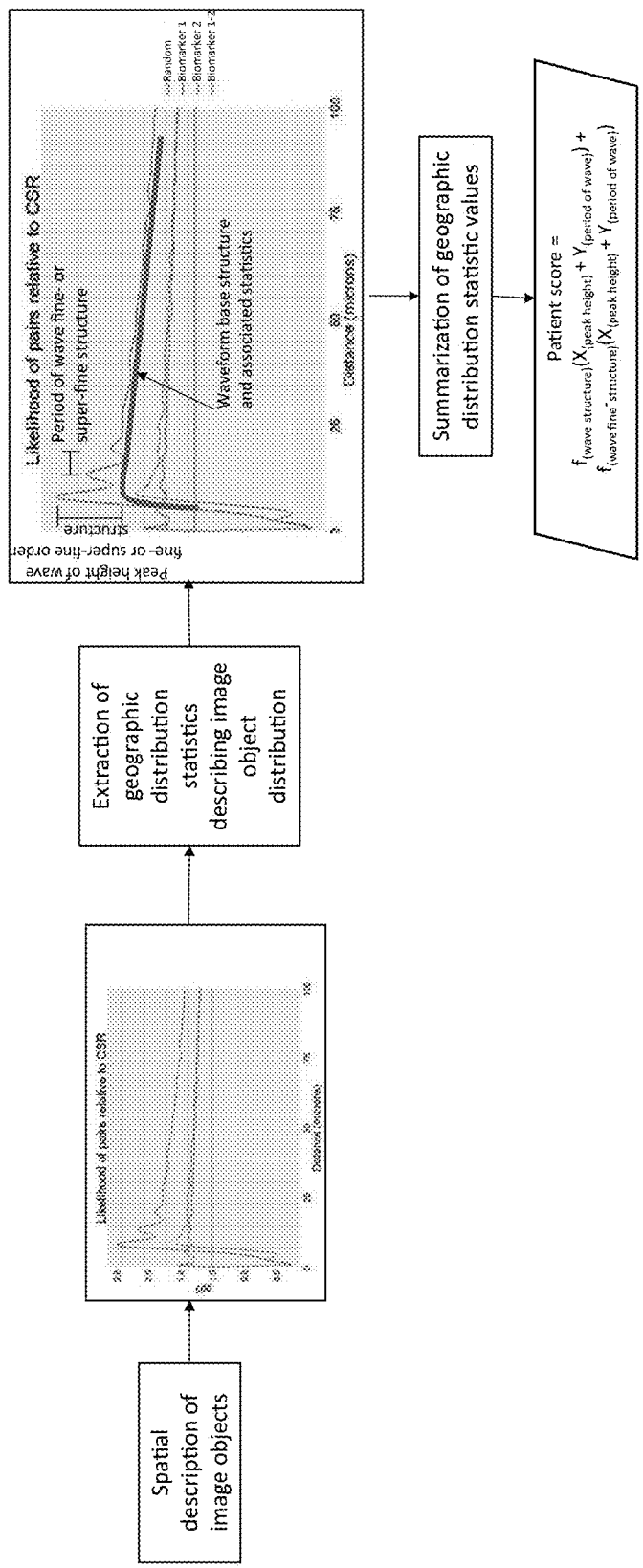
FIG. 12 shows an example of extracting geographic distribution statistics pertaining to the overall structure and fine- or hyper-fine structure of a curve generated by point-pattern analysis of cells in an image.

FIG. 12 provides an illustrative example of extraction of geographic distribution statistics which describe a curve resulting from a point-pattern analysis of a tissue image. In this example, summary statistics which capture both the overall structure or nature of the curve and the fine- or hyper-fine structure of the curve are derived. The dashed line illustrates the overall structure or nature of the curve and statistics pertaining to this aspect of the curve (e.g., AUC, maximum, decay constant from exponential decay fit) can be derived. Furthermore, statistics pertaining to the fine-structure of the curve can also be extracted. These statistics can be summarized to generate a patient score which is derived from one or more statistics relating to the overall structure of the curve, the fine- and hyper-fine structure of the curve, or a combination of both.

In another embodiment of this invention, the geographic distribution of cells is analyzed as areal data within an imposed grid. Areal units are defined as sections of tissue that are continuously connected by boundaries to create a lattice. This lattice can be regularly (e.g., square grid) or irregularly shaped (e.g., tumor nest regions, stroma regions). Image analysis features are summarized within each areal unit giving a spatial pattern of values. This can then be subsequently analyzed and quantified using summative methods such as, but not limited to: spatial autocorrelation (Moran's I, Join Count statistic, Geary's C), hotspot analysis, or spatial cross correlation between biomarkers.

FIG. 13 illustrates this aspect of the invention whereby a stained-tissue section is evaluated using an area-based analysis framework for biomarker-positive cell density within each grid placed on the image.

Figure 14:
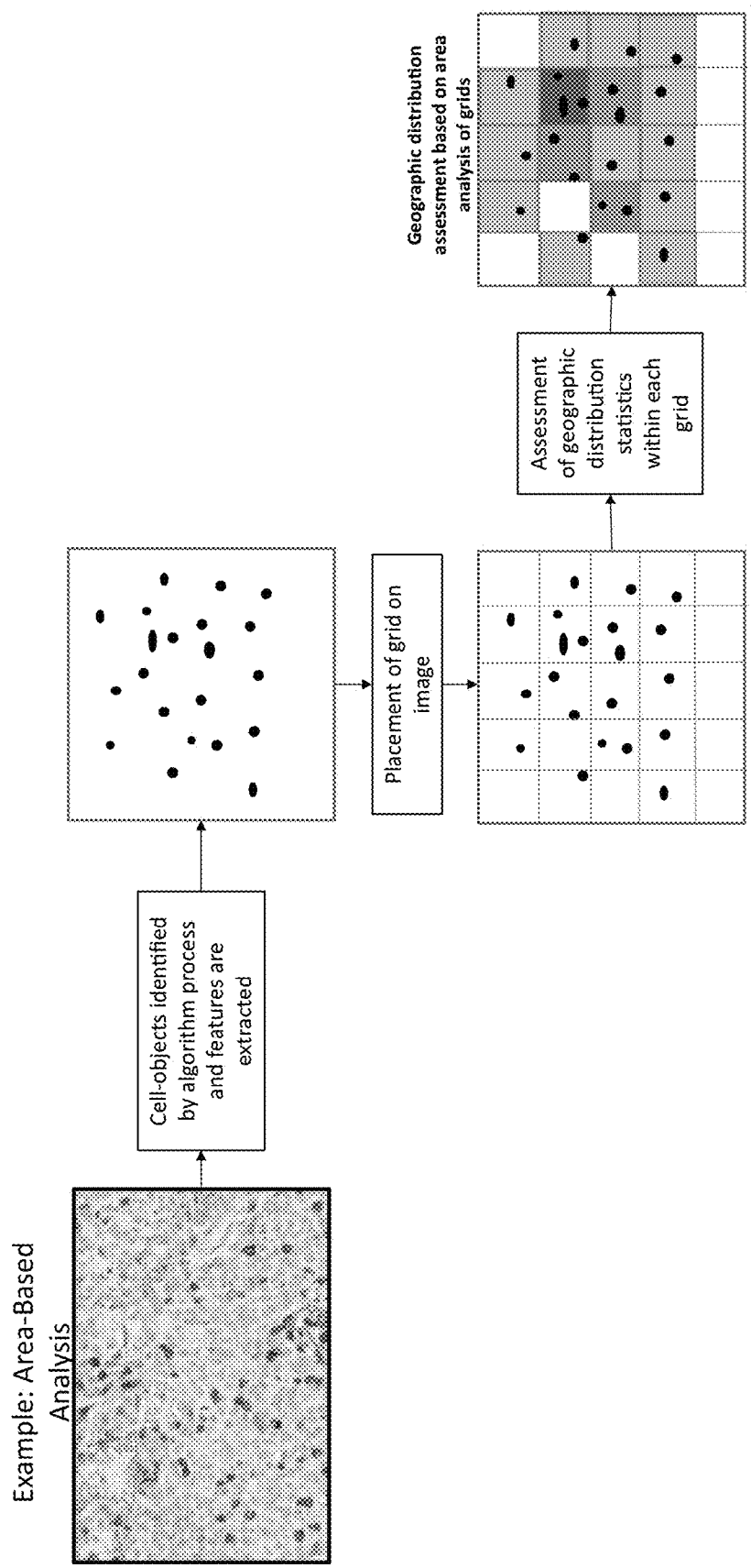
FIG. 14 provides a simple example of area-based analysis of cell objects in an image.

FIG. 14 provides a simple example of area-based analysis framework whereby the frequency of cells within each grid placed on an image of a stained tissue section is determined. Each grid is classified based on the number of cells within each grid.

Figure 15:
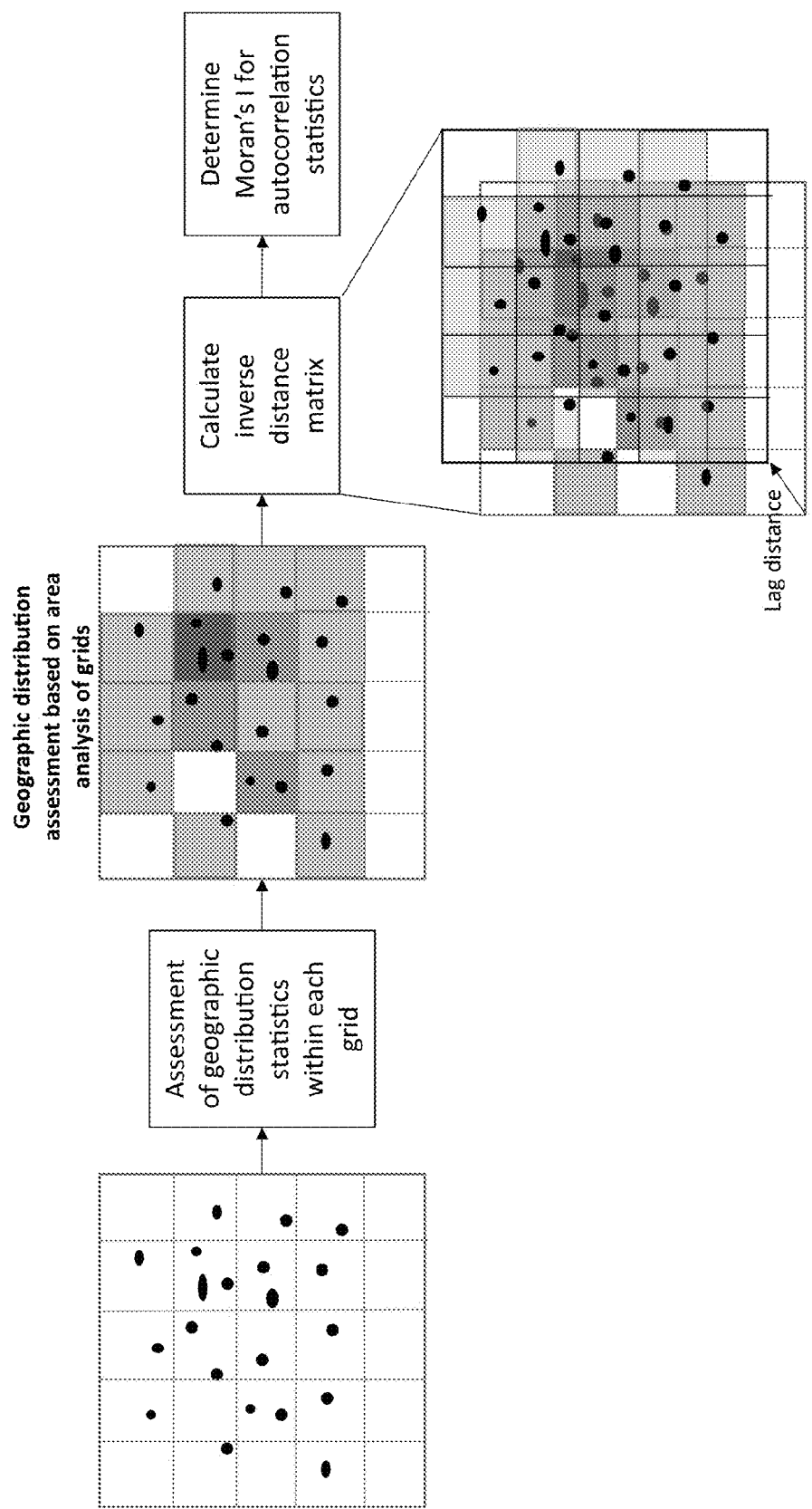
FIG. 15 provides a more complex example of an area-based analysis of cell objects in an image to determine autocorrelation using Moran's I.

FIG. 15 provides an example of a more complex area-based analysis framework whereby a grid is placed over an image and an inverse distance matrix is calculated for the cells located in the grids. Moran's I statistic is calculated as an indicator of autocorrelation within the image and can be visualized as the amount of overlap of the grid with itself at varying lag distances. This specific index would summarize the geographic distribution of cells by assessing the autocorrelation of the feature across all the grid locations.

Figure 16:
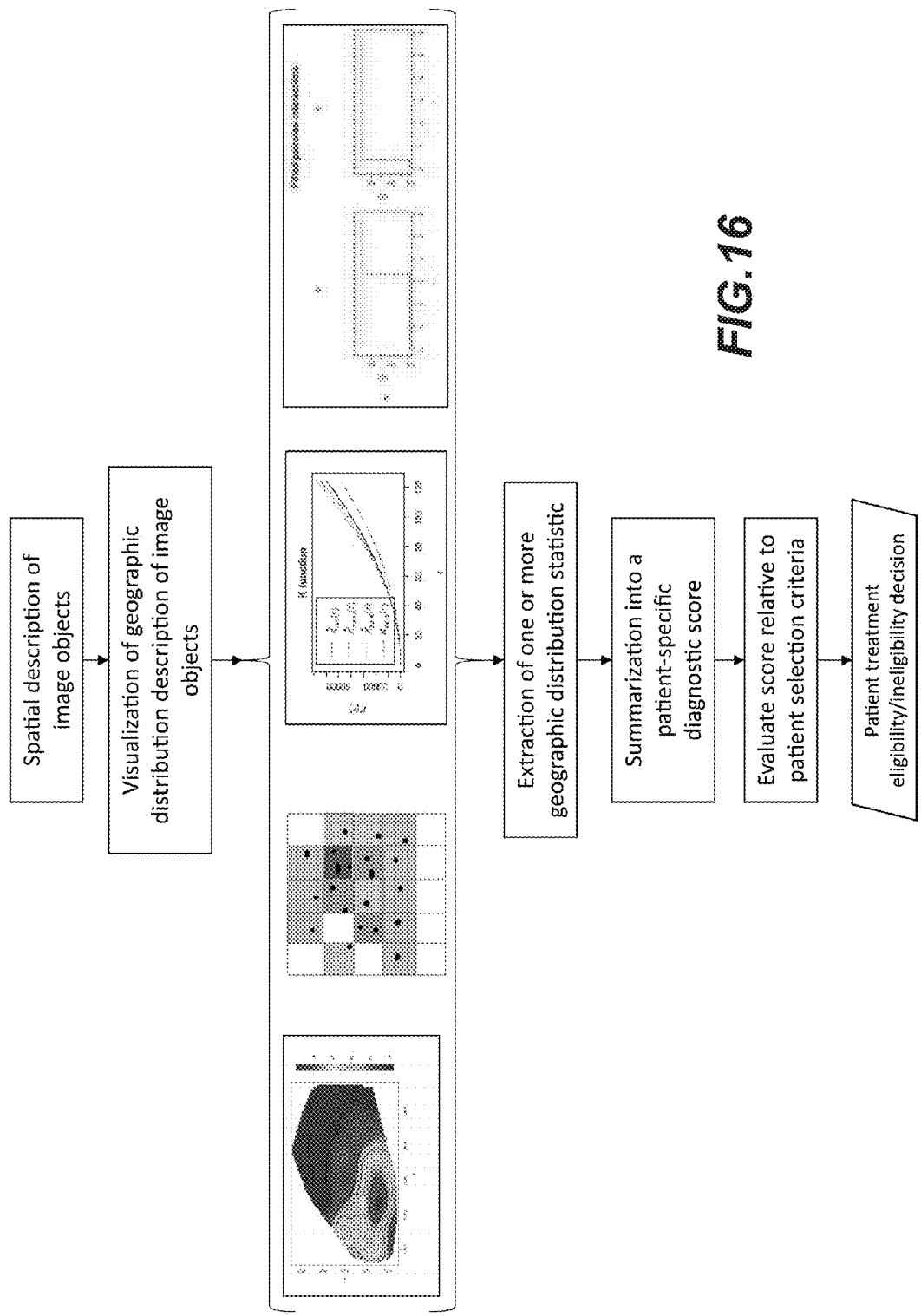
FIG. 16 shows an overview of summarizing one or more geographic distribution statistic derived from an image to determine a patient-specific score, and guiding treatment of the patient based on evaluation of the patient-specific score relative to patient selection criteria.

Guiding Patient Treatment Decisions Based on Geographic Distribution Summary Statistics:

In a further embodiment of the present invention, one or more summary statistic(s) derived from the geographic distribution features for one or more image objects are utilized to stratify patients into two or more groups for guiding identification of a patient as a candidate for a specified therapy. The patient selection criteria will be pre-defined criteria which can be applied to a patient cohort to stratify patients into one or more groups selected to receive a therapy, and one or more groups which are excluded from receiving a therapy. Additionally, the summary statistic(s) are used to infer diagnosis or disease severity or monitor the efficacy of therapy FIG. 16 illustrates this embodiment of the invention, whereby one or more geographic distribution features summary statistic describing the geographical distribution of image objects, or object subsets, are extracted and summarized into a patient-specific score. The patient-specific score can be summarized as a mathematical function of one or more such statistic values. The patient-specific diagnostic score is evaluated relative to the patient selection criteria defined for the tissue-based assay and drug to guide determination of patient eligibility to receive the drug.

In this embodiment of the invention, the patient-specific diagnostic score can be derived from one or more geographic distribution feature statistic calculated from one or more geographic distribution analysis framework (point-pattern, point-referenced, and areal) applied to one or more image objects (e.g., cells, vessels, cell nuclei) or image object subsets (e.g., tumor cells, biomarker 1 positive cells, biomarker n positive cells).

What is claimed is:

1. A method for representing a tissue evaluated by a tissue-based assay as a data array in image analysis feature space, extracting at least one features of the geographical distribution of image objects, and using at least one summary statistic describing said geographical distribution features to guide medical research or practice, the method comprising:

obtaining at least one digital image of at least one tissue section assayed with at least one tissue-based test;

extracting at least one image analysis feature of at least one tissue object within the at least one digital image by applying at least one digital image analysis algorithm process implemented by a computer for the at least one digital image, wherein the at least one image analysis feature is selected from the group consisting of staining, localization, and morphometric features;

storing the at least one image analysis feature for the at least one tissue object in a storage, wherein the storage is selected form the group consisting of storage device and storage repository;

curating the at least one image analysis feature to generate at least one dataset that associates a quantity of a specific analyte or biomolecule at a specific location in the at least one tissue object in the at least one tissue section;

extracting at least one geographical distribution feature from at least one tissue object in the at least one dataset using at least one spatial analysis framework; and deriving at least one summary statistic from the at least one geographical distribution feature.

2. The method of claim 1, wherein the at least one tissue-based test enables evaluation of the at least one tissue objects and at least one biomolecule relative to the spatial location of the at least one tissue object and the at least one biomolecule in the at least one tissue section.

3. The method of claim 1, wherein the staining features are selected from the group consisting of amount of stain and intensity of biomolecules staining.

4. The method of claim 1, wherein morphometric features characterize physical parameters of the at least one tissue object, wherein the physical characteristics are selected from the group consisting of size, shape, area, texture, organization, organizational relationship, and staining appearance.

5. The method of claim 1, wherein location features are selected from the group consisting of absolute x-y image coordinates, relative x-y image coordinates, absolute polar coordinates, relative polar coordinates, absolute complex coordinates, relative complex coordinates, absolute spherical coordinates, relative spherical coordinates, pixel coordinates, and z-axis coordinates.

6. The method of claim 1, wherein the extracting at least one image analysis feature is performed on tissue objects within a fixed location around the tissue objects.

7. The method of claim 1, wherein the at least one geographic distribution feature can be determined by spatial statistics, wherein the spatial statistics are selected from the group consisting of point-pattern, point-referenced, and areal-based methods.

8. The method of claim 7, wherein the at least one tissue object in the at least one dataset is defined by at least one image analysis feature.

9. The method of claim 1, wherein the at least one geographic distribution features can be described as at least one mathematic function.

10. The method of claim 1 further comprising:
determining at least one patient-specific summary score for a patient from the at least one summary statistic;
generating a patient-specific treatment score by evaluating the at least one patient-specific summary score relative to at least one pre-defined reference value and associated medical information of the patient; and
describing the patient as a candidate for a medical outcome based on the patient-specific treatment score, wherein the medical outcome is selected from the group consisting of disease presence, disease status, disease severity, natural course of disease, efficacy of a therapeutic intervention, and response to a therapeutic intervention.

11. The method of claim 9, wherein a patient-specific diagnostic score can be derived from at least one geographic feature distribution summary statistic derived from at least one geographic distribution analysis framework.

12. The method of claim 1, wherein the at least one spatial analysis framework can be applied in series.

13. The method of claim 1, wherein the at least one geographical distribution feature comprises a first geographical distribution feature extracted from a first tissue object in the data array structure and a second geographical distribution feature extracted from a second tissue object in the data array structure.

14. The method of claim 1 further comprising:
determining at least two image specific summary scores for a patient from the at least one summary statistic, and
evaluating similarity for the at least two image specific summary scores.

15. The method of claim 1 further comprising:
determining at least one first image specific summary score for a first patient from the at least one summary statistic and at least one second image specific summary score for a second patient from the at least one summary statistic, and
evaluating similarity of the at least one image specific summary score and the at least one second image specific summary score.

16. The method of claim 1 further comprising:
extracting at least one second image analysis feature of at least one second tissue object within a second digital image by applying at least one digital image analysis algorithm process implemented by a computer for the at least one digital image, wherein the at least one second image analysis feature is selected from the group consisting of staining, localization, and morphometric features, and wherein the at least one second image analysis feature includes a z-axis coordinate value relating the at least one second image analysis feature to the at least first one image analysis feature for the at least one first tissue object.

17. The method of claim 16 further comprising assigning the z-axis coordinate value to create at least one combination image comprised of the first digital image and second digital image.

18. The method of claim 1 further comprising:
determining at least one patient-specific summary score for a patient from the at least one summary statistic;
generating a patient-specific score by evaluating the at least one patient-specific summary score relative to at least one pre-defined reference value and associated medical information of the patient; and
determining at least one patient status for the patient based on the patient-specific score, wherein the at least one patient status is selected from the group consisting of diagnosis, disease severity, disease progression, and therapy efficacy.

* * * * *